United States Patent [19]

Duvia

[11] 3,966,068

[45] June 29, 1976

[54] POWERED VEHICLE WITH CONTROLS FOR LOADING, UNLOADING AND DISCHARGE TILTING OF A SEPARABLE CONTAINER

[76] Inventor: Orazio Duvia, Via Carducci, 19100 La Spezia, Italy

[22] Filed: July 12, 1974

[21] Appl. No.: 488,008

[30] Foreign Application Priority Data

Sept. 27, 1973 Italy.................................. 16706/73

[52] U.S. Cl................................ 214/317; 294/83 R
[51] Int. Cl.²......................................... B65G 65/04
[58] Field of Search........... 214/302, 313, 315, 316, 214/317, 318; 294/83 R, 84

[56] References Cited
UNITED STATES PATENTS

| | | | |
|---|---|---|---|
| 2,273,359 | 2/1942 | Johnson............................ | 214/317 |
| 2,872,717 | 2/1959 | Kelley............................... | 294/83 R |
| 3,722,720 | 3/1973 | Sjostrom et al................... | 214/317 |

FOREIGN PATENTS OR APPLICATIONS 1,325,088  3/1963  France.............................. 214/315

*Primary Examiner*—Robert J. Spar
*Assistant Examiner*—Lawrence J. Oresky
*Attorney, Agent, or Firm*—Thomas E. Beall, Jr.

[57] ABSTRACT

An independent container provided with its own wheels for movement on a support surface and which is carried about on the bed of a truck, is unloaded, loaded, and tilted for discharge with respect to the truck by a mechanism employing a fixed or collapsible container pivot that is secured to the truck; an extensible arm that engages the container at a point spaced from the fixed pivot to tilt the container about the fixed pivot for discharge of its load, and powered means for rotating the arm, without extension of the arm and with the pivot disconnected so as to move the container between a position on the truck bed and a position adjacent the truck on a support surface.

8 Claims, 5 Drawing Figures

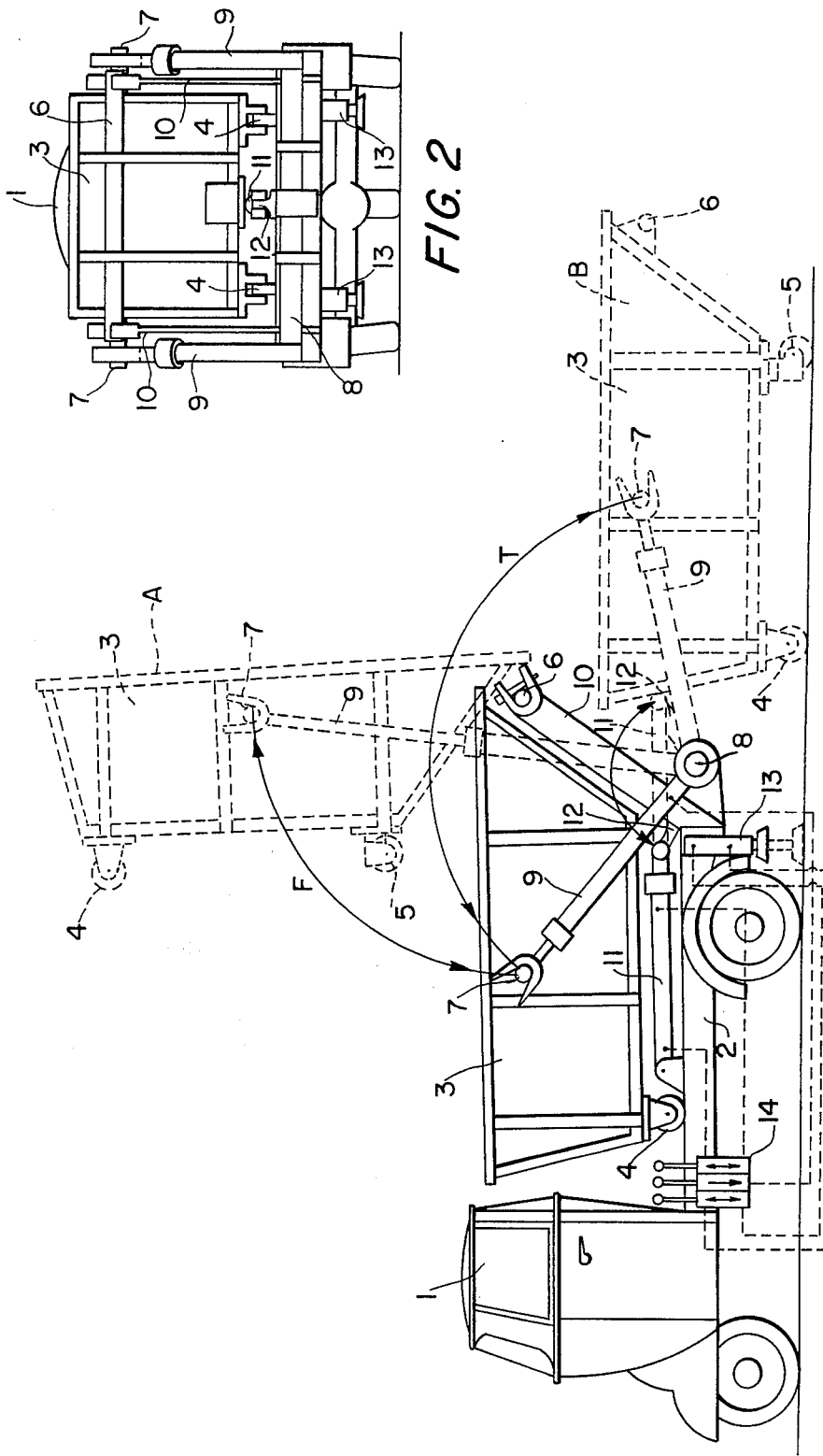

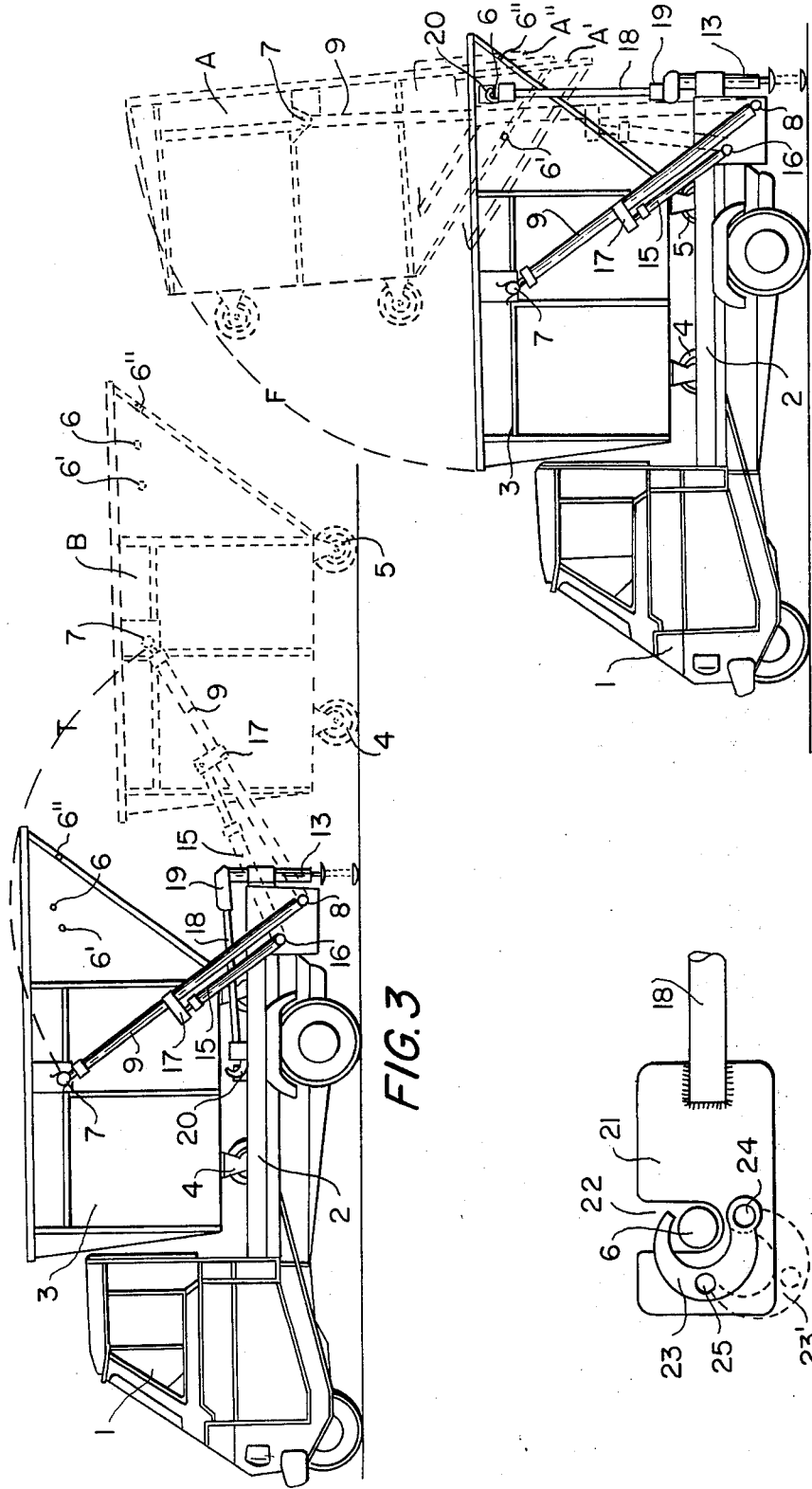

POWERED VEHICLE WITH CONTROLS FOR LOADING, UNLOADING AND DISCHARGE TILTING OF A SEPARABLE CONTAINER

BACKGROUND OF THE INVENTION

Vehicles for the transport of merchandise, products or the like are known wherein a container may be tilted with respect to the vehicle body by mechanical or fluid power systems for the discharge of the load. This arrangement facilitates unloading, if the products are merely to be placed in piles adjacent the vehicles. However, difficulties are encountered when it is desired to discharge the products with respect to outside systems, for example onto slides, conveyor belts, forklifts, or the like, because the prior art vehicles have generally discharged the products from the container at a relatively low elevation. Particular problems are encountered with respect to smaller transport vehicles, for example light weight motor vehicles, since their wheel base is quite low, which does not permit an adequate arrangement of the transported product into piles due to the low elevation of discharge.

Further disadvantages of the prior art present themselves when the transporting motor vehicle is permanently fixed to the container, so that the vehicle will remain inactive during the loading and unloading operations, which in some particular cases or circumstances can involve a considerable length of time and in addition to this other small removals may have to be made if the container cannot be separated from the vehicle; an urban waste disposal system is a particular example of an environment wherein these disadvantages are encountered. Considerable advantages are obtained when a plurality of containers are served by a single transport motor vehicle, and in such a system, the ease with which the container is placed upon the ground and loaded onto the truck become quite important, particularly when the container is provided with its own wheels so that it may be moved about, filled and when fully loaded it may be placed upon the vehicle and thereafter taken to its destination. For particular products, it may be necessary to place the container upon the ground in order to facilitate unloading, because such prior systems cannot unload by tipping.

SUMMARY OF THE INVENTION

The present invention employs a motor transport vehicle that can support the separate container for tipping about a fixed horizontal pivot axis spaced above the container carrying bed of the vehicle, with such tipping being accomplished by a fluid powered system so as to provide for the unloading of the material into piles adjacent the vehicle.

The container itself may also be placed upon the ground and reloaded onto the vehicle by means of a separate fluid powered system, which will rotate the container about a separate horizontal pivot axis, spaced from the first pivot axis, and located adjacent the extreme rear of the vehicle bed. Because the unloading of the container and placing it upon the ground may have an unbalancing affect upon the transport vehicle, fluid powered stabilizers may be provided. The container preferably has it own wheels, any number of which may be pivoted about vertical axes for steering.

The tipping axis for the container may be provided by horizontal pivot pins on the container body engaging in bearings fixed with respect to the vehicle body, which bearings may be formed by rigid arms extending from the rear of the vehicle bed or by selectively collapsible arms extending from the rear of the bed. Further, the container may contain a plurality of such pins selectivly engagable with the bearing so as to provide for different tipping height of the container.

A plurality of telescopically expansible arms are provided to engage in pivot bearings on the container on an axis spaced from the container tipping axis, so that expansion of these arms will tip the container about the tipping axis, and rotation of the arms about a horizontal axis will move the container from its loaded and unloaded positions.

BRIEF DESCRIPTION OF THE DRAWING

Further objects, features and advantages of the present invention will become more clear from the following detailed description of a preferred embodiment, as shown in the attached drawing, wherein:

FIG. 1 is a side elevation view of a transport truck as disclosed in Italian Pat. No. 966,646, Feb. 20, 1974;

FIG. 2 is a rear elevation view of the transport vehicle of FIG. 1;

FIG. 3 is a side elevation view of a transport vehicle employing the features of the present invention, showing the manner in which the container is unloaded;

FIG. 4 is a side elevation view of the transport vehicle of FIG. 3, and showing the manner in which the container is tipped for discharging its contents; and FIG. 5 is an enlarged partial view of a coupling employed in the embodiment of FIGS. 3 and 4.

DETAILED DESCRIPTION OF THE DRAWING

In FIG. 1, the transport vehicle has a conventional cab 1, and load supporting bed 2 for carrying thereon a container 3. The container 3 is provided with a pair of wheels 4 that are mounted for rotation about horizontal axes fixed with respect to the container 3, and further provided with wheels 5 that are rotatable about their horizontal axes, which axes are mounted for vertical pivoting movement with respect to the container 3, for purposes of facilitating steering the container that is moved about upon a support surface independent of the transport vehicle.

For purposes of tipping and unloading the container 3, a horizontal shaft 6 is fixedly secured to the container 3 across its rearward upper end, and horizontally extending pins 7 are fixed to the opposite upper side of the container 3. The shaft 6 and pins 7 are vertically spaced above the horizontal mid plane of the container 3 and the pins 7 are located at approximately the vertical mid plane of the container 3, with respect to its weight distribution.

The transport vehicle is provided at its rearward end with stationary bearing that support a transversely extending shaft 8 for pivoting movement about a horizontal axis. A pair of telescoping arms 9 are fixedly secured at their lower end for rotation with the shaft 8 and have at their opposite end a fork-like bearing receiving therein the pins 7, respectively. Two support posts 10 extend upwardly and rearwardly from the rearward end of the transport vehicle bed 2, to which they are fixedly attached, and have at their upper ends fork-like bearings respectively receiving their opposite ends of the shaft 6 of the container 3. A double acting piston - cylinder 11 is pivotally attached at one end to the vehicle bed 2 and pivotally attached at its opposite end to a lever 12 that is fixedly secured to the shaft 8. The rearward end of the vehicle bed 2 is provided with double acting piston-cylinder stabilizers 13.

All of the above mentioned piston-cylinder arrangements are operated from a control station 14 having therein valves for supplying and exhausting control fluid as indicated by the various control lines.

In operating the embodiment of FIGS. 1 and 2, the various positions of the container 3 have been indicated in dotted lines together with the various positions of the vehicle control elements.

In order to tip the container 3 so as to discharge its contents into a pile to the rear of the vehicle, the control 14 is operated so as to provide fluid to expand the arm 9 so as to rotate the container 3 about the pivot axis of shaft 6, as indicated by the arrow F, to where the container 3 will assume the discharge position A shown in dotted lines, with a shaft 6 being pivotally held within the fork-like bearing of the stationary supports 10. In this matter, it is seen that the container 3 is considerably elevated so that it may discharge its contents from a considerable elevation for example into a high pile or another rather high container.

In order to unload the container 3 from the vehicle bed 2 and place it upon the ground, the container 3 is moved from its full line position to its dotted line unloaded position B by operating the controls 14 so as to provide pressurized fluid to the piston-cylinder arrangement 11 so as to expand it and rotate the shaft 8 by means of the lever 12, so that the arms 9 will correspondingly be rotated about the axis of the shaft 8; thus, the axis of the pins 7 will travel along the arcuate path T as the container 3 is moved from its full line position to its dotted line position B.

Once the container is unloaded upon the ground, it may be towed on its own wheels 4 and 5, and after unloading operations have been taken place, or the like, the container 3 may be replaced or loaded back onto the vehicle bed 2 by supplying pressurized fluid to the opposite end of the double acting piston-cylinder arrangement 11. During either the just described unloading or loading operation, it is desirable to activate the piston-cylinders 13 so as to extend their supporting feet downwardly into engagement with the ground to act as stabilizers and prevent an unbalancing of the vehicle.

In FIGS. 3–5, the same numerals have been provided as in FIGS. 1–3, with respect to structure that is substantially identical for both, and accordingly such structure will not be further described in detail. If desired, all of the wheels 4 and 5 may rotate about axes that are pivoted about vertical axes to facilitate steering of the container upon the ground. The vehicle bed 2 is preferably provided with a plurality of recesses (not shown in detail) for respectively receiving therein the wheels 4, 5 to stabilize support of the container 3 upon the vehicle bed 2.

In FIGS. 3–5, there are three pairs of pins 6, 6', 6'' fixedly secured on respective sides of the container 3 along an arc having a center of curvature at the pivot axis 8 of the arm 9. A greater or lesser number of such pairs of pins may be employed as desired. Further, the embodiment of FIGS. 3–5 employs a pivoted connection between the upper end of the arm 9 and the pins 7 of the container 3, in the manner previously described with respect the embodiment of FIGS. 1–3.

Instead of the double acting piston-cylinder 11 of FIGS. 1 and 2, the embodiment of FIGS. 3–5 employs a double acting piston-cylinder 15 that is mounted for pivoting movement about a horizontal axis to the bed 2 of the vehicle at its lower end 16 and which is mounted for relative horizontal axis pivotal movement at its upper end to a bracket 17 that is rigidly secured to the mid-portion of the cylinder of the element 9 that is pivoted at 8.

Instead of employing the fixed bearing supports 10 of FIGS. 1–2, the present invention employs two laterally spaced lever arms 18 that are mounted for rotation about a horizontal axis in bearings 19 fixed to the bed 2 of the vehicle, at one end of the lever arms 18; and the arms 18 are provided with couplings 20 at their opposite ends to selectively engage with the pins 6, or the pins 6', or the pins 6'' of the container 3. Details of these couplings 20 are shown in FIG. 5, wherein it is seen that a plate 21 is fixedly secured to the lever arm 18, and which plate 21 has a recess 22 for receiving therein, respectively, one of the pins 6 (or 6', or 6''), which pin is prevented from escaping from the recess 22 by means of a blocking hook 23. The hook 23 is pivotally mounted with respect to the plate 21 by means of a bearing 24, and further has a handle 25 which may be used to pivot the hook 23 between its solid line blocking position and its dotted line position 23' wherein it will permit removal of the pin 6 from the recess 22.

With respect to the operation of the present invention, the loading and unloading of the container is shown in FIG. 3, whereas the tipping of the container for discharge of its contents is shown in FIG. 4.

In order to place the container upon the ground, that is unload the container 3, from its full line loaded position to its dotted line unloading position, and to further reload the container on the vehicle, suitable controls (not shown) are used to provide fluid to the double acting cylinder-piston arrangements 15 so as to rotate the arms 9 about their axis of the bearing 8, so as to move the axis of the pins 7 along the arcuate path T, so that the entire container 3 as a body moves along the arcuate path T about the center of rotation of the shaft 8, and always during this rotation maintains itself in an upright position due to the location of the pins 7 in the previously described position wherein they are above the horizontal mid-plane and approximately on the vertical mid-plane of the container 3.

To discharge the contents of the container 3, that is to move the container 3 from its full line position as shown in FIG. 4 to its dotted line position A, it is necessary to manually pivot the lever arms 18 about their axis 19 so as to engage the couplings 20 with a selected one of the pins 6, 6', 6'', which selected pins thus become the pivot axis for the container 3 during its tilting, as shown by the dotted line positions A, A', and A'' respectively corresponding to the selection of the pins 6, 6', 6''. The lever arms 18 are mounted such that they will not pivot in the clock-wise direction beyond their position as illustrated in FIG. 4. Thus, it is seen that the height of the container in its pivoted discharge position may be varied according to the selection of the pins 6, 6', 6''.

The present invention, obtains better balanced movements, particularly with respect to the placement of the container on the ground and with respect to tilting the container to its discharged position at various heights.

While the present invention has been shown and described in detail for purposes of illustration and for the merits of the details themselves, further embodiments, variations and modifications are contemplated according to the broader aspects of the present invention, all as determined by the spirit and scope of the following claims.

What is claimed is:

1. A material handling device, comprising: a wheeled, self-powered transport vehicle having a container carrying bed, support means for forming a first horizontal pivot axis bearing for the container above and toward the rear of said vehicle body, and connecting means rotatable about a second horizontal axis fixed with respect to the vehicle bed and spaced from said first axis for pivotally engaging the container at a third horizontal pivot axis fixed with respect to the container and spaced from said axes; first power means for expanding said connecting means to increase the spacing between said second and third axes to correspondingly pivot the container rearwardly and upwardly about said first axis for discharge of the container contents; second power means for rotating said connecting means about said second axis from a first position wherein the container is on the vehicle bed to a second position wherein the container is entirely removed from the vehicle bed and placed upon the vehicle support surface; said support means including a support mounted on each side of said vehicle bed to be selectively moved from an upright position defining the position of said first pivot to a second position for purposes of storage; each of said support means further being mounted for movement between selected positions corresponding to different first axis location; a container having a plurality of first axis rigid pins on each side spaced from each other corresponding to said first axis location; and each of said supports being a rigid arm pivotally mounted about a fourth axis to said vehicle body and fixing the distance between said first axis and said fourth axis; and said first axis pins on each side being located on an arc having said fourth axis as a center of curvature.

2. The device of claim 1, wherein each of said supports is fixedly pivoted at one end to said vehicle bed and has at its opposite end a tangentially opening slot for receiving therein the rigid pin of the container to form the first pivot axis, and further has a hook member pivotly mounted on said opposite end to selectively close the tangentially opening recess and prevent removal of the pin from said recess and said hook having a pivot axis offset with respect to the geometric center of the hook body when the hook will be maintained in its blocking position by gravity.

3. The device of claim 1, further including vertically extendable stabilizer means mounted to said bed rearwardly of the vehicle wheels for selectively engaging the support surface of the vehicle wheel.

4. The device of claim 1, wherein said second power means includes a double acting piston-cylinder pivotally mounted at one end to said vehicle bed and at its opposite end to said connecting means to have a line of action between said second and third pivot axes.

5. The device of claim 1, wherein said first power means is a double-acting piston-cylinder.

6. The device of claim 1, wherein each of said supports is a rigid arm pivoted at its lower end to said vehicle bed and in said second position said arm is generally horizontal on said vehicle bed.

7. A material handling device, comprising: a wheeled, self-powered transport vehicle having a container carrying bed, a removable container having a plurality of first axis rigid pins on each side spaced from each other in the same pattern so that each pin on one side is transversely aligned with a corresponding pin on the other side when the container is on the vehicle bed; support means mounted to said vehicle bed on each side of said vehicle bed and having bearings for respectively engaging a selected pair of said pins to form a first horizontal pivot axis for the container, with the location of the first horizontal pivot axis corresponding to the pair of pins selected and being located above and at the discharge end of the vehicle bed; connecting means rotatable about a second horizontal pivot axis fixed with respect to the vehicle bed and spaced from any of said first axes for pivotally engaging the container at a third horizontal pivot axis fixed with respect to the container and spaced from the other of said axes; power means for rotating said connecting means about said second axis from a first position wherein the container is on the vehicle bed to a second position wherein the container is entirely removed from the vehicle bed and placed upon the vehicle support surface when the support means do not engage the pins, and said power means further rotating said connecting means when said support means are in engagement with a selected pair of said pins to pivot said container about the first axis formed by the selected pair of pins to a raised position discharging the contents of said container; said support means and pins constituting together means for determining the height of said container at said raised position and correspondingly the discharge height in direct accordance with the selected pair of pins.

8. The device of claim 7, wherein each of said supports is a rigid arm pivotally mounted about a fourth axis to said vehicle bed and fixing the distance between said first axis and said fourth axis; and wherein said first axis pins on each side are located on an arc having said fourth axis as a center of curvature.

* * * * *